United States Patent
Becker et al.

(10) Patent No.: US 10,006,751 B2
(45) Date of Patent: Jun. 26, 2018

(54) SMART METROLOGY STAND

(71) Applicants: Eric S Becker, Blue Springs, MO (US); Joel R Gorden, Grain Valley, MO (US)

(72) Inventors: Eric S Becker, Blue Springs, MO (US); Joel R Gorden, Grain Valley, MO (US)

(73) Assignee: MetrologyWorks, Inc., Buckner, MO (US)

( * ) Notice: Subject to any disclaimer, the term of this patent is extended or adjusted under 35 U.S.C. 154(b) by 0 days. days.

(21) Appl. No.: 15/136,719

(22) Filed: Apr. 22, 2016

(65) Prior Publication Data

US 2016/0320169 A1 Nov. 3, 2016

Related U.S. Application Data

(60) Provisional application No. 62/153,894, filed on Apr. 28, 2015.

(51) Int. Cl.
*F16M 11/00* (2006.01)
*G01B 5/00* (2006.01)
(Continued)

(52) U.S. Cl.
CPC ........... *G01B 5/0004* (2013.01); *F16M 11/06* (2013.01); *F16M 11/18* (2013.01);
(Continued)

(58) Field of Classification Search
CPC .................................................. F16M 11/00
See application file for complete search history.

(56) References Cited

U.S. PATENT DOCUMENTS

| 6,086,283 A | 7/2000 | Ziegert |
| 8,220,173 B2 | 7/2012 | Tait |

(Continued)

FOREIGN PATENT DOCUMENTS

WO 2001033161 A1 5/2001

OTHER PUBLICATIONS

International Search Report issued in PCT/US 2016/029668 dated Apr. 28, 2016.
(Continued)

*Primary Examiner* — Amy J. Sterling
(74) *Attorney, Agent, or Firm* — Jason E. Gorden

(57) ABSTRACT

Various intelligent stands are disclosed that sense potential changes in their position and environment such that they can provide an alert and feedback to a user of the stand or software that is being used in conjunction with a portable Coordinate Measuring Machine ("CMM") if movement or an environmental change has occurred that may impact the accuracy of a measurement made by a CMM that is being supported by the intelligent stand. In various embodiments, the smart stand also contains onboard software capable of collecting data from a CMM eliminating the need for a separate computer with associated measurement software. The smart stand also has the ability to work with a network of other wireless sensors that can be attached to the part of interest or objects in the environment to sense if the part has been bumped or the extended environment has changed.

9 Claims, 8 Drawing Sheets

(51) Int. Cl.
*F16M 11/28* (2006.01)
*F16M 11/24* (2006.01)
*F16M 11/18* (2006.01)
*F16M 11/06* (2006.01)
*F16M 11/42* (2006.01)
*G01B 5/008* (2006.01)
*G01S 17/66* (2006.01)
*G01S 7/481* (2006.01)
*G01S 7/497* (2006.01)

(52) U.S. Cl.
CPC ........... *F16M 11/242* (2013.01); *F16M 11/28* (2013.01); *F16M 11/42* (2013.01); *G01B 5/008* (2013.01); *G01S 7/4813* (2013.01); *G01S 7/497* (2013.01); *G01S 17/66* (2013.01); *F16M 2200/066* (2013.01)

(56) References Cited

U.S. PATENT DOCUMENTS

| | | | |
|---|---|---|---|
| 8,724,123 B2 | 5/2014 | Seifert | |
| 8,819,979 B2* | 9/2014 | Kelly | F41A 17/46 42/70.07 |
| 8,898,919 B2 | 12/2014 | Bridges et al. | |
| 2010/0007875 A1* | 1/2010 | Li | G01B 11/27 356/237.5 |
| 2014/0378281 A1* | 12/2014 | Mazi | A63B 69/34 482/83 |

OTHER PUBLICATIONS

Written Opinion of the International Searching Authority issued in PCT/US 2016/029668 dated Apr. 28, 2016.

\* cited by examiner

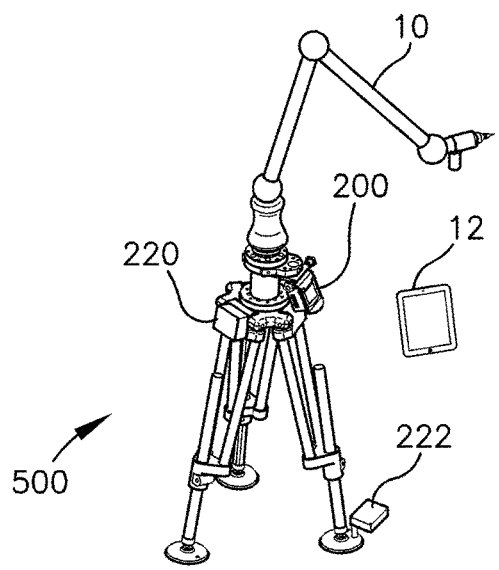
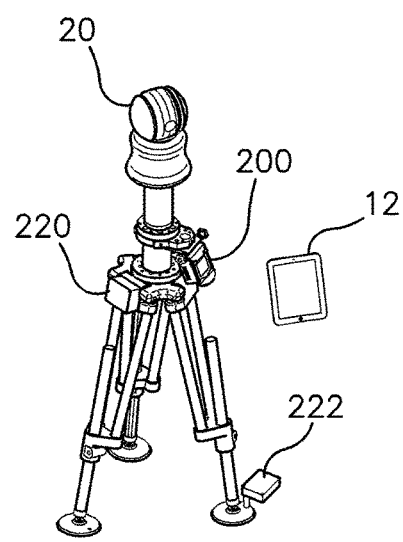
Fig. 5    Fig. 6
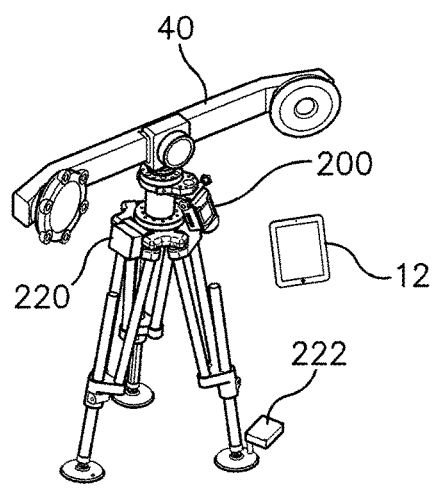
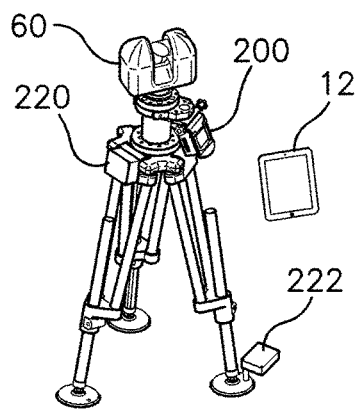
Fig. 7    Fig. 8

SMART METROLOGY STAND

CROSS REFERENCE TO RELATED APPLICATIONS

This application claims the benefit of U.S. Provisional Patent Application No. 62/153,894 filed on Apr. 28, 2015, the contents of which are incorporated herein in their entirety.

BACKGROUND

A portable coordinate measuring machine ("CMM") is an electromechanical device used to measure the physical characteristics of an object in three-dimensional ("3D") space. This typically relates to size, form, and position of features that are reported in either a cartesian, cylindrical, or spherical coordinate system. CMMs can be manually manipulated or computer numerical control ("CNC") driven. The first portable CMM's were stationary and were typically affixed to a large steel plate or granite slab in a traditional right-angle X, Y, Z manner much like a machine tool and used a contact probe to take measurements. Current technology makes it possible to measure using both contact and non-contact methods on both stationary and portable CMM's. Portable CMM's are a class of devices that include articulating arms, laser trackers, optical trackers, and other 3D imagers and have become popular due to their flexibility and portability. These devices no longer require a granite slab that they are mounted to, so they depend on an extremely stable mounting setup to establish their initial (world) coordinate system. All measurements collected are kept relative to this initial coordinate system so it is of utmost importance that there is essentially no movement at the base of the measuring device. A portable CMM measurement system is made up of a measurement device, a data collection computer and interface software. The computers for stationary CMM's are typically desktop computers while portable CMM's need a more portable data collection device which often ends up being a laptop which still can be bulky and hard to manage in an industrial environment. Conventional metrology stands are used to provide a platform on which to operate portable CMMs such as measuring arms or laser trackers. The accuracy of any measurement made with a CMM depends on the rigidity and stable position of the stand. Additionally, air temperature, pressure and humidity can impact measurements taken by a CMM due to factors such as the physical expansion of materials based on temperature and the influence they have on the refractive index of air. Temperature plays a major role in thermal expansion and contraction of materials that are used to assemble these portable measurement devices. Length and diameter changes can be sources of error and add additional uncertainty to CMM measurements. Some existing CMMs have built-in environmental sensors, but many do not, and in any case conventional stands are subject to movement if, for example they are bumped or if they are subjected to sufficient vibration that the position of the stand moves relative to the object that is being measured.

SUMMARY

Various intelligent stands are disclosed that sense potential changes in their position and environment such that they can provide an alert and feedback to a user of the stand or software that is being used in conjunction with a portable CMM if movement or an environmental change has occurred that may impact the accuracy of a measurement made by a CMM that is being supported by the intelligent stand. In various embodiments, the smart stand also contains onboard software capable of collecting data from a CMM eliminating the need for a separate computer with associated measurement software. The smart stand also has the ability to work with a network of other wireless sensors that can be attached to the part of interest or objects in the environment to sense if the part has been bumped or the extended environment has changed.

DESCRIPTION OF THE FIGURES

FIG. 5 shows a smart portable tripod supporting a portable articulating measurement arm.

FIG. 6 shows a smart portable tripod supporting laser tracker.

FIG. 7 shows a smart portable tripod supporting a 3D Imager or optical tracker.

FIG. 8 shows a smart portable intelligent tripod supporting a laser scanner.

DETAILED DESCRIPTION

Figure 1:
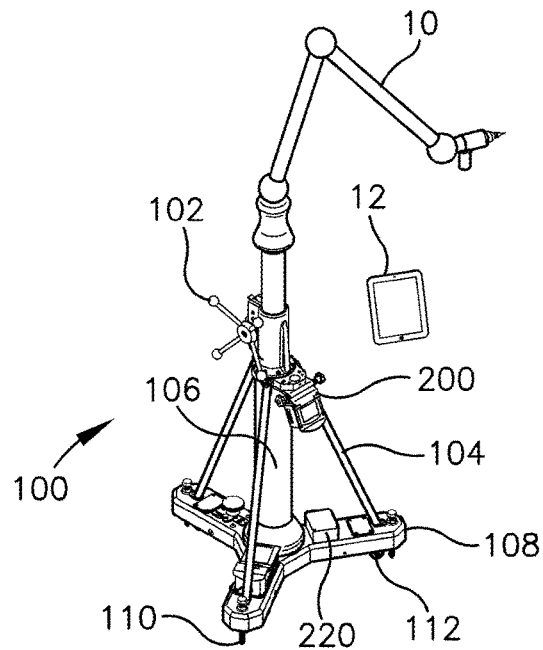
FIG. 1 shows a smart rolling stand supporting a portable articulating measurement arm.

FIG. 1 shows a smart rolling stand supporting a portable articulating measurement arm 10. The term "smart stand" as used in this description refers to any kind of metrology mount that can detect environmental parameters that could be relevant to measurements taken in connection with the smart stand. Several exemplary embodiments of smart stands are disclosed including rolling stands, tripods, and magnetic mounts. It will be understood that these teachings are not limited to the disclosed embodiments and could also apply to other types of metrology mounts such as vacuum mounts or the like. In various embodiments, a smart stand is implemented by way of the display module 200 and the intelligent sensor module 220, which are rigidly attached to the rolling stand 100. In some embodiments, a tablet 12 (such as an iPad or an Android tablet) can be used in connection with both the display module 200 and the intelligent sensor module 220, while in other embodiments, only a tablet is used with intelligent sensor module 220 and in others only the display module 200 is used. As will be readily understood, tablet 12 could also be implemented by way of a smartphone such as an iPhone, Android phone, or a Windows phone. In various embodiments, a laptop or other general purpose computer could be substituted for tablet 12 as needed. A tablet has the nice balance of being lightweight but still having significant screen space to display parameters associated with the smart stand. In various embodiments, the tablet-type device 12 communicates wirelessly with either or both of display module 200 and sensor module 220 using low energy Bluetooth, Wifi, or any other wireless connectivity mechanism. Wifi and bluetooth have the advantage of being extensively implemented in available tablet devices, with bluetooth having the advantage of being relatively low-power.

Handle 102 is used to raise or lower the measurement device that the stand supports. An adjustable height rolling stand allows a user to easily move a piece of portable measurement equipment around an environment without the need to tear the instrument down and put it back up. It allows the user to pop the stand up on three casters 112, roll it across the floor, and then lower it back down in a new location onto three bolts 110 that provide three points of contact which prevents rocking of the stand. The height adjustability allows the operator to put the instrument at an optimal height either ergonomically or based on line of site etc. Often it is beneficial for a laser tracker or 3D scanner to be higher in the air for a better view of larger parts.

Rolling stand 100 has casters 112 that allow it to be rolled along a hard surface such as a concrete floor, and once the stand 100 is in the desired position, the wheels are retracted and bolts 110 either set down on the surface or are cranked down to support the stand 100 and to prevent any movement of the stand and the CMM that it is supporting. In this configuration, under ordinary circumstances, stand 100 is very stable using only three points of contact. Nevertheless, if the stand is struck with substantial force, it could move slightly, which would cause all subsequent measurements made by the CMM that it is supporting to be off by the amount of the movement caused by the force. Exemplary impacts could include inadvertently kicking the stand or striking it with factory equipment in the plant where the measurements are being conducted.

In various embodiments, display module 200 and/or sensor module 220 contain a microprocessor and various connected internal or external sensors. In some embodiments, the sensors include one or more temperature sensors, one or more digital electromechanical accelerometers, one or more electromechanical barometers and humidity detection devices, one or more light sensors, one or more electromagnetic field detectors, external rotatable accelerometers that can provide a gravitational "bubble-level" type level detection and one or more internal or external optical sensors.

In some embodiments in which the smart stand is used in connection with measurement arm 10 and environmental event such as an impact to the stand can be detected. For example, if the operator of the measurement arm left the stand temporarily unattended, a curious factory worker may approach the stand and inadvertently bump or kick it. In this embodiment, the accelerometer in the intelligent sensor module 220 would detect the acceleration event caused by the impact and provide a configurable alert to the user of the stand that he or she would need to check the origin of the CMM to make sure the impact did not actually cause the stand to move.

In various embodiments, significant changes in ambient temperature could cause subsequent measurements to be incorrect because of changes in size of various components in either the part of interest or the mount due to thermal expansion or contraction. Accordingly, changes in temperature can cause configurable alerts to be provided to the user of the smart stand.

Because acceleration is the second derivative of position, an accelerometer detects impact at the smart stand. The impact detection can be calibrated such that a sufficient impact is likely to have caused movement. At steady state, an accelerometer can detect the tilt of an object, while a gyroscope can measure rotation and a magnetometer can measure an object's orientation within the earth's magnetic field. However, in various embodiments, it may be useful to measure the actual distance of movement that has occurred. In an embodiment, an optical sensor is used to measure actual movement of the stand. In this embodiment, the optical sensor contains one or more digital cameras such as a charge-coupled device ("CCD") or complementary metal-oxide semiconductor ("CMOS") digital camera associated with the optical sensor. In an embodiment, the camera has an associated flash or LED(s) so that periodic images can be made of a target even in the absence of ambient light. In an embodiment, there is a hole in the leg of the stand onto which the optical sensor is mounted. Alternatively, the camera or cameras can be located in any position such that they can detect potential movement with respect to a reference target.

In various embodiments, a baseline image is taken of the target on the floor below the stand. In an embodiment, the target is a white sticker with a contrasting-colored 'x' printed on the sticker. In various embodiments, the target is a chessboard pattern or a 2d barcode. In alternative embodiments, the target can be a mark on the floor or any kind of a target viewing region with contrasting features that already exists or can be attached to and removed from the floor on which the smart stand is operated (or to any stable reference point to the thing being measured, including the thing being measured). In various embodiments, the optical sensor is external to one of the modules 200 or 220 associated with a smart stand and connected wirelessly or via a cable to one of the modules 200 or 220. In further alternative embodiments, the optical sensor is a camera in sensor module 220 which has a line of sight to a target. In other embodiments, the housing of sensor module 220 extends over the side of leg 108 of the stand permitting the optical sensor(s) to have a sight line to its target. In an embodiment, the sight line is through the bottom of the housing of sensor module 220.

In an embodiment, the optical sensor is used to measure movement in two dimensions. An alternative embodiment involves a three-dimensional use case employing one or more sensors, which may be calibrated to have a certified accuracy, in combination that can also be combined with one or more emitters to provide accurate 3D geometric data of an artifact that could be monitored for changes in size or location. In an embodiment, one or more targets, such as one or more spherical targets or unique surface geometries, located on a fixed reference surface, such as on the floor or on the part or element being measured are imaged in three-dimensional space to provide the capability to detect movement of the stand in three dimensions.

In various embodiments, the smart stand will use an optical sensor whether internal to one of the modules or external to first to take a baseline image and then periodically take new images, The new images can be compared to the baseline images to ascertain whether the smart stand has been subjected to movement. As will be described below, the amount of noise in the compared image and tolerable movement is user configurable in the smart stand.

Figure 2:
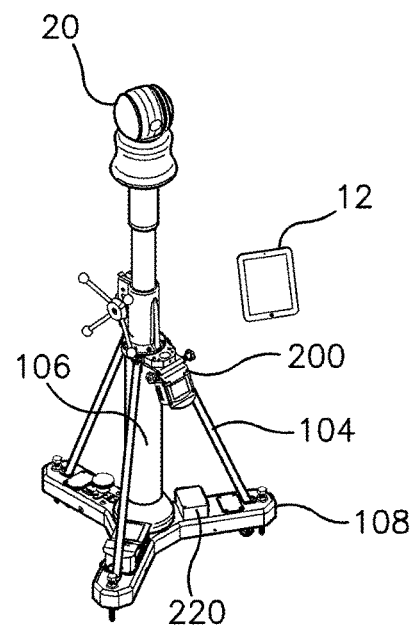
FIG. 2 shows a smart rolling stand supporting a laser tracker.

FIG. 2 shows a smart rolling stand supporting a laser tracker 20. In various embodiments, the laser tracker 20 is supported by a rolling stand 100. A laser tracker is a portable CMM that uses a horizontal rotation, a vertical rotation, and a laser based distance measurement to determine the location of a corner cube retroreflector in space. The corner cube retroreflector returns the laser beam in a parallel path to the device. Internal sensors analyze the distance between the exit and return paths to determine if the corner cube has or is moving and then robotically drives the sensor head to keep the distance between paths to a minimum enabling the sensor head to follow the corner cube. Commonly the corner cube is centered in a ball or sphere referred to as a spherically mounted retroreflector ("SMR") to enable precise measurements using known offsets based on the radius of the ball. Laser trackers are capable of measuring long distances which makes the sensor heads setup and stability especially important due the fact that a tiny displacement or vibration could have quite significant effects when amplified due to the usage of angular measurements over long distances. In some instances, air pressure and changes in relative air humidity can cause changes in taken measurements due to the changes in the refractive index of air. Therefore, it is beneficial to be able to observe and measure these environmental factors as well to either generate warnings or errors or to allow for automated compensation for the factors.

As described in connection with FIG. 1, a smart stand may be implemented with a combination of some or all three of display module 200, sensor module 220 and tablet-type device 12. An additional advantage of using the tablet-type device 12 in connection with a laser tracker is that feedback and alerts provided by the smart stand can be received by a user of the laser tracker 20 in the normal mode of operation of the laser tracker. In such embodiments, it may be preferable for the user of the laser tracker 20 to use a smartphone-sized device for tablet-type device 12, as the user could put the device into his or her pocket.

For example, the user of the laser tracker may be employing an SMR in connection with the laser tracker 20. In such a case, the user may be some distance from the smart stand such as in the case of a user measuring an aircraft wing, for example.

Display module 200 and sensor module 220 will require a power source in order to operate. The power source could be, for example, a conventional 12V wall-mount power adapter such as used to power a laptop computer. Alternatively, a battery may be provided inside of the housing of modules 200 and/or 220. In some embodiments, an externally mounted battery 114 is provided that can be removed and recharged as needed. Use of the removable, rechargeable battery has the benefit of allowing the stand to be used remotely from an electrical power outlet. In various embodiments, onboard power is provided in the form of a separate on-board power module 116. In an embodiment, on-board power module 116 contains a battery such as a lithium ion battery. In various embodiments, power module 116 includes power strips and/or additional USB ports to provide power outlets to peripheral devices associated with the smart stand as well as to power the smart stand itself.

Figure 3:
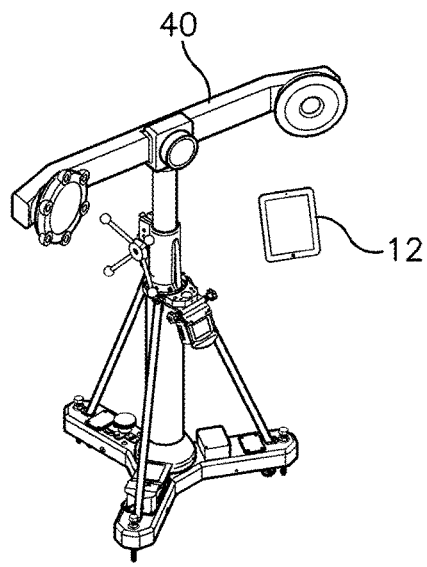
FIG. 3 shows a smart rolling stand supporting a 3D Imager or optical tracker.

FIG. 3 shows a smart rolling stand supporting a 3D Imager or optical tracker 40. A 3D Imager uses a projected pattern or light source to cover a surface then one or more sensors take an image of the object surface and create a 3D cloud of data points that represent the surface digitally based on the snapshot or image. Then multiple images can be put together using a variety of software based methods to create a complete scan. An optical tracker functions in a similar way in that it typically either has a light source to illuminate individual target points in space or the target points themselves are a light source and one or more sensors measure the target point's location in space relative to the sensors position. The system can measure one or more target points simultaneously and at a rapid refresh rate keeping track of individual target points over time.

3D imagers are capable of measuring very fine detail like the text on a coin for example and sometimes measurements can take a significant amount of time from many seconds to many minutes if multiple exposures or other techniques are used. Accordingly, it is important that the source, sensor, and object remain very still during this capture period or there will be shifts and noise introduced into the data that renders the data erroneous much like a blurry picture.

Figure 4:
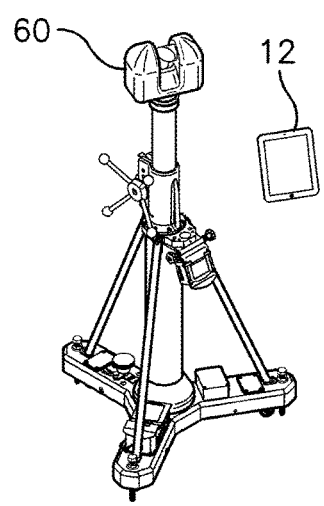
FIG. 4 shows a smart rolling stand supporting a laser scanner.

FIG. 4 shows a smart stand supporting a laser scanner 60. A laser scanner or similar light based ranging device measures two angles and a ranging distance to measure a point typically via a laser-based time-of-flight or phased based distance measurement where light is emitted from the scanner head and light is reflected off the surface of an object being digitized. They commonly rotate about at least one axis and have a rotating mirror to direct the light and are capable of measuring at thousands of points per second. Because of the very large number of points, individual scans can take minutes or even hours.

These portable laser scanners are often used in industrial environments to measure larger objects such as cars, airplanes or buildings. These industrial environments are commonly subject to vibration and temperature change thus requiring environmental sensing especially when performing scans that last longer periods of time. Because of their long distance measurement capabilities there are often large distances between setups and for this reason they are frequently used on portable tripods.

FIG. 5 shows a smart portable tripod supporting a portable articulating measurement arm 10. As described in connection with FIG. 1 and rolling stand 100, a CMM measurement arm can be used in connection with portable tripod 500. While stands such as rolling stand 100 typically have substantial mass and inertia which prevent small impacts from causing movement of the stand, portable stands such as portable tripod 500 can more easily be disturbed by environmental events such as being kicked or otherwise struck. Portable tripods due to their need to be carried by an operator commonly are made of or contain aluminum which expands or contracts with significant temperature swings. This could mean that the origin of a measurement device has shifted in space and needs to corrected or otherwise compensated for. In various embodiments, the smart stand could alert an operator via an alarm that a temperature change had occurred and give the operator an opportunity to take corrective action, such as to start over with the measurements or to scale measurements according to the shift associated with the expansion or contraction of the tripod.

In various embodiments, sensor module 220 shown in connection with the tripods has an internal optical sensor as described in connection with FIG. 1. This optical sensor can be used with the tripod to detect tripod movement as further described in this specification.

FIGS. 6, 7, and 8 show other embodiments of smart portable tripods 500 used in connection with the other types of CMM described in connection with FIGS. 2, 3, and 4.

Figures 9, 10:
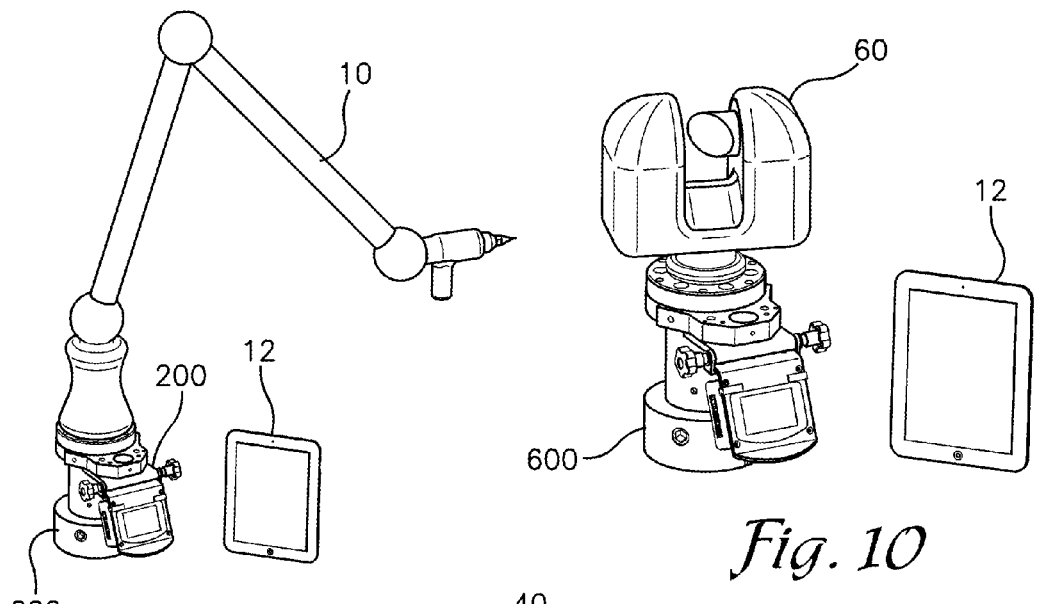
FIG. 9 shows a smart magnetic mount supporting a portable articulating measurement arm.
FIG. 10 shows a smart magnetic mount supporting a laser scanner.

FIG. 9 shows a smart magnetic mount 600 supporting a portable articulating measurement arm 10. Magnetic mounts are used in applications where there is a ferromagnetic surface available like a steel welding table or any even flat metal surface on the object being measured itself. They can easily be moved around a surface as they do not require a bolt pattern.

In various embodiments, display module 200 as shown can be replaced with a sensor module 220 that will be used in connection with a tablet 12 or other laptop, etc. as further described in this specification. In such a case, the sensor module could incorporate an optical sensor to be used with a target to detect movement of the magnetic mount 600.

Figure 11:
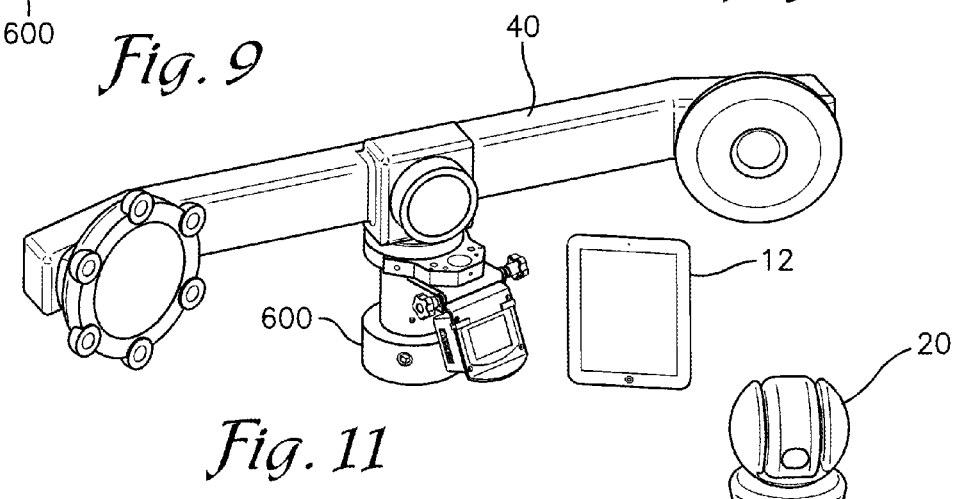
FIG. 11 shows a smart magnetic mount supporting a 3D Imager or optical tracker.
Figure 12:
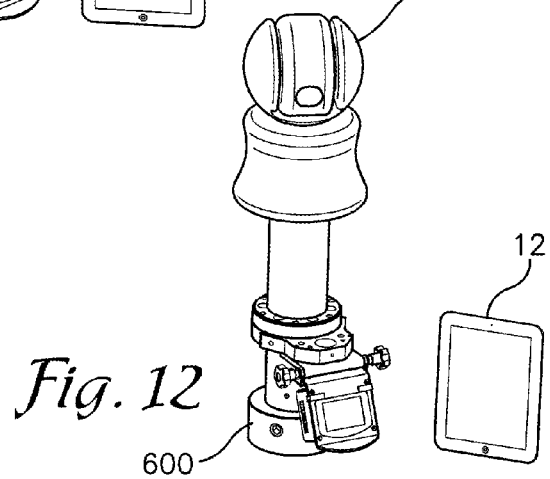
FIG. 12 shows a smart magnetic mount supporting a laser tracker.

FIGS. 10, 11, and 12 show other embodiments of smart portable tripods 500 used in connection with the other types of CMM described in connection with FIGS. 2, 3, and 4.

Figure 13:
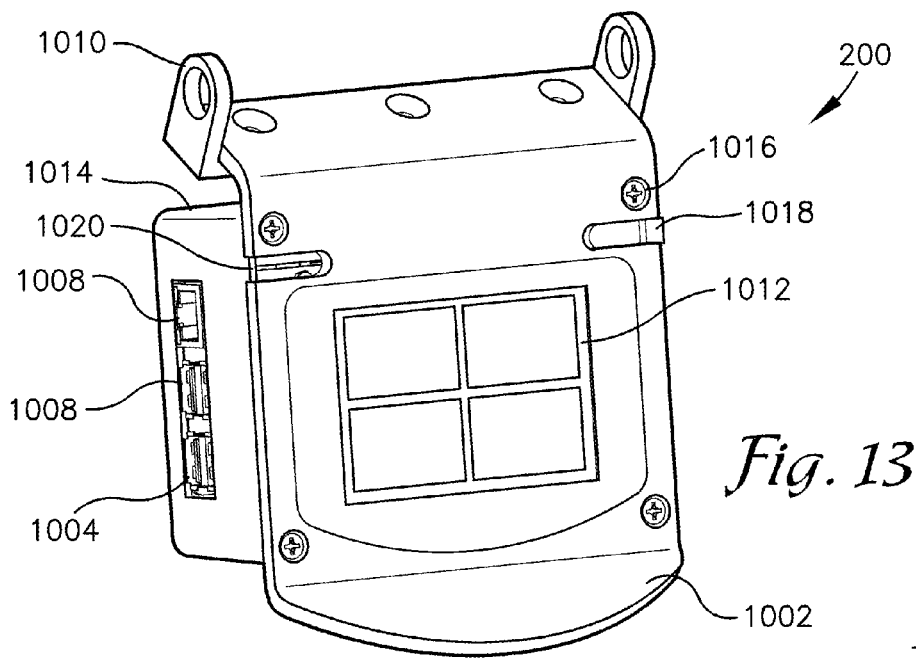
FIG. 13 shows a display module.

FIG. 13 shows a display module 200 with display 1012. In various embodiments, the display module 200 contains any needed sensor to detect smart stand environmental conditions such that it is a stand-alone device when attached to a stand such as a rolling stand, portable tripod or magnetic mount completely implements smart stand functionality. In various other embodiments, remote temperature sensors are used, and in other embodiments, sensor module 220 and/or tablet-type device 12 are used. In various embodiments, a small, embedded system-on-chip platform ("SOC board") such as the Raspberry Pi or Intel Edison can be used, providing the benefit of having full embedded operating system access. In various embodiments an embedded real-time operating system is used, however, for some applications the SOC board is sufficiently fast that an ordinary linux operating system provides adequate speed to monitor the state of all sensors. In some other embodiments, small, low power microcontrollers such as an Arduino or PIC microcontroller from Microchip Technology, Inc. are employed.

In various embodiments, the display module 200 is enclosed in housing 1014 and the associated SOC or microcontroller boards are affixed to faceplate 1002, which is fastened to housing 1014 with screws 1016. In various embodiments, mounting bracket 1010 is used to rotatably mount the display module 200 to a metrology stand as shown in the previous figures. In various embodiments, input/output ports are exposed through a side of the housing 1014. In one embodiment, four universal serial bus ("USB") ports 1004 are exposed. In an embodiment, ethernet port 1008 is provided. It will be understood that a Wifi interface can be provided using a USB Wifi interface. Bluetooth and other wireless protocols can be similarly provided.

In various embodiments, in addition to the screen 1012, light emitting diodes ("LEDs") are used to provide a status indication. In one embodiment, the LEDs are controlled by the SOC board and they illuminate light pipes 1018 and 1020. In various embodiments, the LEDs are either red, yellow, or green. In this embodiment, red means that one of the parameters is in an error condition, yellow means warning, and green means that all parameters are within an acceptable range. In one embodiment, individual red, yellow, and green LEDs are used. In another embodiment, bi-color LEDs are used such that when both red and green are illuminated, the LED becomes yellow.

In various embodiments, screen 1012 is a thin-film transistor ("TFT") liquid crystal display ("LCD"). In some embodiments the screen 1012 incorporates a resistive or capacitive touch screen on its surface. The screen 1012 and its associated touch screen provides for a user interface as described in connection with the figures below.

Figure 14:
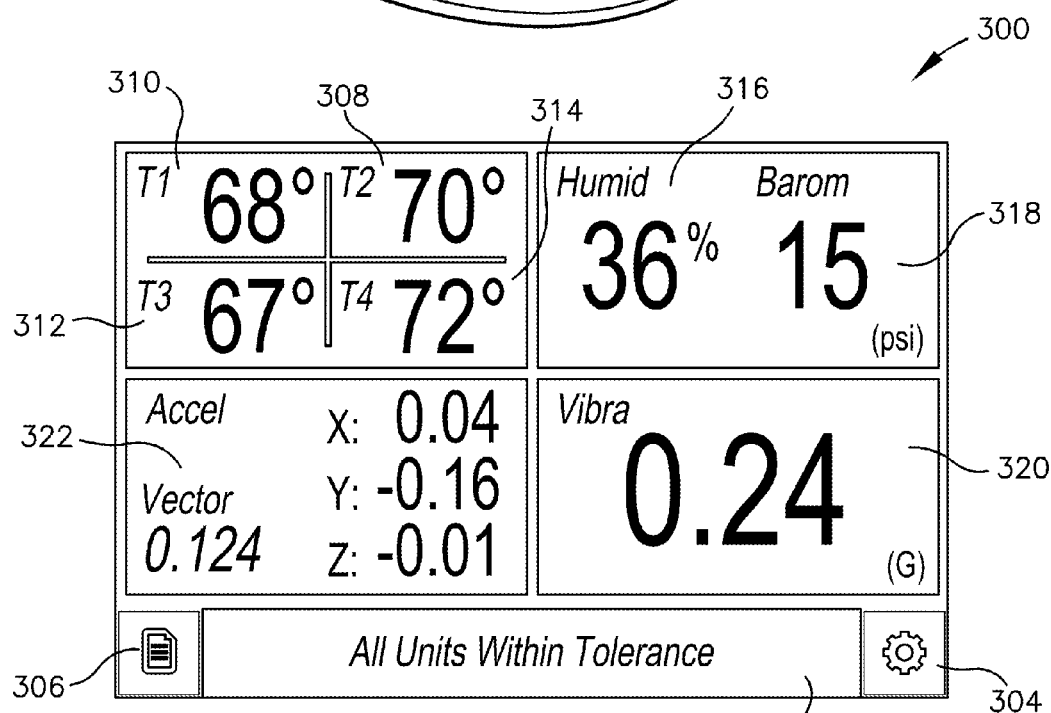
FIG. 14 shows a summary screen for displaying parameters associated with a smart stand.

FIG. 14 shows a summary screen 300 for displaying parameters associated with a smart stand. In various embodiments, screen 300 is the first screen on an app running on a smartphone or tablet 12. In other embodiments, it is a window provided by an application running on a laptop or other kind of general purpose computer. In other embodiments, the screen is run on an application and displayed on screen 1012 in the display module 200. In various embodiments, indication bar 302 is provided to provide an indication of the status of the parameters. In one embodiment, if the indication bar 302 is green it will indicate that there are no warning or error conditions and that all of the measured parameters are within the acceptable range. For example, this could mean that the accelerometer had not recorded any acceleration events that would indicate that the stand had been moved or that the optical sensor also did not detect movement. Similarly, if the temperature had stayed within a configurable range, the bar would remain green indicating that there had not been any temperature changes that were significant enough to affect measurements made with the CMM on the stand. The same would apply to other detected environmental conditions.

In various embodiments, one or more external temperature probes can be provided to measure the temperature at various locations. In an embodiment, these temperatures are displayed at quadrants 308, 310, 312, and 314. In an embodiment, the external temperature sensors are implemented with a one-wire serial protocol such as that used by the DS18B20 temperature sensor. In an embodiment, the one or more external temperature sensors are connected via a connector provided on the opposite side of housing 1014 from the USB ports 1004. In an embodiment, a temperature sensor is also provided inside of the display module 200 or sensor module 220. However, in some cases, the internal temperature sensor would not be able to accurately measure the ambient air temperature around the stand because of the heat generated by the electronics (such as the SOC board) contained within the housing 1014. In various embodiments, the external temperature sensors could also measure barometric pressure and humidity or any combination of temperature, pressure and humidity, or other environmental parameters. It will be understood that the external temperature sensors could be connected to the one or more modules of the smart stand by any wired or wireless means or protocol such as those already described herein.

In various embodiments, quadrant 316 is used to display the current humidity and barometric pressure, whereas quadrant 320 displays a parameter related to the current difference in g-force from the baseline force initially measured. Any of the quadrants could alternatively be used to display the optically measured movement parameter or parameters.

In various embodiments, this differential g-force measurement is measured using a three-dimensional, electromechanical, digital accelerometer such as the ADXL345 from Analog Devices, Inc. In an embodiment, an initial three-dimensional reading is taken from the accelerometer, and this initial reading is stored. When subsequent readings are taken, they are compared to the baseline. Significant deviations from the baseline indicate that the accelerometer has experienced a significant force event rather than minor deviations which may represent noise or simply the ambient noise vibrations of a workspace. In an embodiment, a force vector is calculated by calculating the square root of the sum of the squares of the differences in force in each dimension. In an embodiment, a value associated with this force or impact is displayed in quadrant 320. The quadrant is displayed in FIG. 14 with a label of "Vibra" but it could also have the label of "Force" or "Impact".

In various embodiments, quadrant 322 displays the current forces in each dimension. If the accelerometer is oriented such that the Z component represents gravitational force, then the Z component will be approximately 1, i.e. 1 g. As the accelerometer is tilted these numbers will change as some component of the gravitational force is then applied to one or both of the X and Y dimensions. If the accelerometer receives a shock or impact (such as when a stand is kicked) the spring inside of the electromechanical accelerometer device will move causing different readings to be observed in the X, Y, and Z dimensions.

In various embodiments, the accelerometer provides force vector readings more than 50 or 100 times per second. In an embodiment, if the difference in observed force vectors from the baseline exceeds a configurable warning threshold, then a warning is issued. In an embodiment, a loudspeaker is provided inside housing 1014. In alternative embodiments, an external speaker is connected to the display module 200 or sensor module 220 by audio cable, bluetooth or other means of connecting an external speaker. In other embodiments, the audible alarm is provided at the laptop that is running the smart stand software. When the warning condition is experienced, a configurable alarm is provided. In an embodiment, when the warning condition is experienced, the light pipes 1020 and 1018 are illuminated yellow, the indication bar 302 also becomes yellow, and the text on the indication bar indicates which parameter has exceeded the warning threshold and a time and date associated with it. In an embodiment, touching (or clicking on with a mouse—in the non-touch embodiments such as when the application is running on a non-touch screen laptop) indication bar 302 will clear the warning condition. In an embodiment, clearing the warning condition will also cause a new accelerometer and/or optical sensor baseline to be calculated.

In various embodiments, instead of or in addition to the force dimension components being stored as a baseline, a target image base line is stored in connection with an optical sensor associated with the smart stand. In this case, image information about an imaged target is stored as a baseline, and subsequent images are compared to the baseline to determine a target image difference. In various embodiments, this difference is expressed as a scaled pixel difference, and warning and error scaled pixel difference values can be stored in the smart stand to result in configurable warning and error conditions as described below in connection with other parameter values. In an embodiment, a composite image is displayed to the user showing a visual indication of the scaled pixel difference between the baseline image and the one corresponding to a displaced position. In various embodiments, the accelerometer and the optical sensor are used in connection with each other so that the optical sensor does not take an image while the smart stand is at movement. The accelerometer can detect an impact and then detect when the stand has come to rest after the impact, at which time the optical sensor could take a still image reading.

In various embodiments, a configurable error threshold can also be provided to the smart stand application. Similarly to the warning scenario above, if the error threshold is exceeded, the light pipes 1020 and 1018 will illuminate red, the indication bar will turn red, and a configurable error alarm will sound on the loudspeaker. In one embodiment, the error alarm will sound until the alarm is cleared. In an alternative embodiment, the error will only sound for a predetermined time such as two seconds. In yet another embodiment, the duration of the error alarm is configurable. In an embodiment, the error condition can be cleared by touching or clicking the indication bar 302 or by otherwise clearing the warning or error condition.

In various embodiments, the user navigates to a log screen by touching or clicking log icon 306 and navigates to a configuration settings screen by touching or clicking settings icon 304.

Under certain circumstances with the use of a smart stand, a user will be more interested in knowing that the stand has not experienced any kind of an impact or environmental exception. In other words, all the user wants to know is that the stand has not been impacted to movement and the temperature and other environmental parameters have remained within range for a particular amount of time, say 30 minutes, two hours, or a day. This could be important, for example, if a user had to leave a smart stand unattended for a period of time. Accordingly, in various embodiments the indication bar 302 can be used to display the amount of consecutive time without experiencing an error and/or warning.

Figure 15:
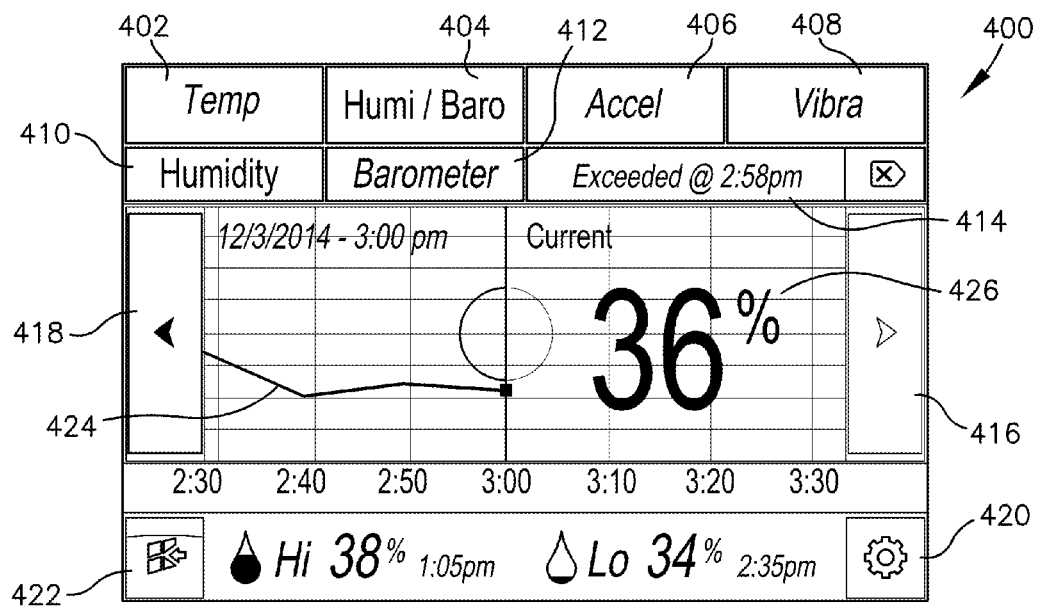
FIG. 15 shows a detail screen for a humidity sensor associated with a smart stand.

FIG. 15 shows a detail screen for a humidity sensor associated with a smart stand. In various embodiments, the detail screens can be navigated to by the user using tabs 402, 404, 406, and 408. In the embodiment shown in connection with screen 400 the detail tabs correspond to temperature, humidity and barometric pressure, acceleration, and differential force from the baseline which is referred to in FIG. 15 as "Vibra". As noted above, in various embodiments, the label "Vibra" is substituted with the label "Force", "Impact" or "Movement" since the parameter associated with this quadrant relates to the magnitude of vibration, the amount of force applied, or an impact or movement that is experienced by the smart stand. The user can navigate back to the summary screen by touching or clicking on summary screen icon 422. The user can navigate to the settings screen by touching or clicking settings icon 420.

In various embodiments, a second level of detail screens can be navigated to by use of sub-tabs 410 and 412. In screen 400, as shown, the humidity sub-tab is active. If the user clicked on the barometer sub-tab 412, details regarding the current barometric pressure and the recorded history would be displayed. In various embodiments, maximum and minimum values and the times they occurred are displayed at the bottom center of the screen. In the depicted example, the maximum value was 38% and it occurred at 1:05 pm. The minimum value was 34% and it was observed at 2:35 pm. In some embodiments both the time and date are also displayed.

In various embodiments, a historical graph of the displayed parameter is shown by way of trend line 424 and using arrow buttons 418 and 416, the user can scroll forward and backward in time to view the observed parameter value at the particular time. As shown in screen 400, the units of time per division are ten minutes. In an embodiment, the amount of time per division is configurable in the settings part of the smart stand application. In this way the user can control the time resolution when viewing the trend line corresponding to the parameter being displayed in the particular detail screen. In various embodiments, indication bar 414 displays the current state of the detail parameter, and like indication bar 302 of FIG. 14, the bar will be red, yellow, or green depending on error, warning, or no-error condition respectively. In an embodiment, touching or clicking on indication bar 414 will clear the warning or error condition and reset the optical and/or accelerometer baselines.

Figure 16:
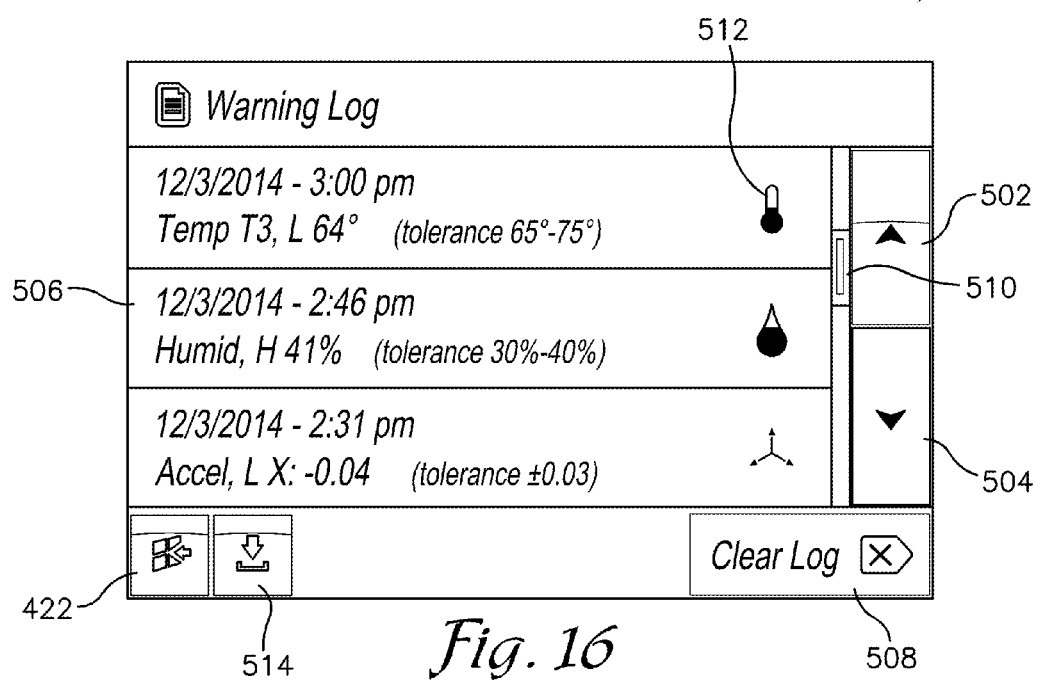
FIG. 16 shows a log screen for a smart stand.

FIG. 16 shows a log screen 500 for a smart stand. In various embodiments, warning and error events as described above are logged in the smart stand. As described above, the sensors and logging capabilities may be contained in display module 200 or in sensor module 220. In either case, the logged data can be exported from one of the modules by way of inserting a removable USB flash drive into one of the USB ports. Alternatively, the log information may be exported by way of the wireless network connection of one of the modules, bluetooth, etc. The user initiates a log download event by touching or clicking log download icon 514. In an embodiment, the smart stand application is running on a laptop or other external general-purpose computer and in this case, the logs are already on the computing platform that will be used to analyze the logs, and therefore no further transport of the logs is initially needed.

The user can scroll up and down within the log screen by way of up button 502 and down button 504. In this way, the user navigates through the various log entries 506. Scroller 510 graphically indicates how high or low a position in the overall logs is being displayed. In an embodiment, the scroller 510 is merely a display element. In alternative embodiments, the scroller can be touched or clicked and held to move up and down within the log file.

In an embodiment an icon such as temp icon 512 is displayed to graphically show that the log has recorded an entry for a temperature event. In various embodiments, separate logs and log screens are provided for warning and error events. In alternative embodiments, both warning and error logs and screens are combined with a log entry identifying itself as either a warning or an error log. In an embodiment, the log can be filtered based on whether it is a warning or error log. In yet another embodiment, only error log entries are recorded.

In exemplary log screen 500 the log events can be cleared by touching or clicking "Clear Log" button 508. The user navigates back to the summary screen 300 by clicking on summary screen icon 422.

In various embodiments, the smart stand has a set of settings screens by which means the configuration of the smart stand can be set. For example, units can be set for temperature, i.e. Fahrenheit or Celsius. A screen is provided in which to input the current time zone and date and time that can be set for an embedded real-time clock ("RTC") that is used in connection with the SOC board or microcontroller. A settings screen is provided to input the high and low settings for the configurable warning and error setpoints used in connection with the smart stand.

Figure 17:
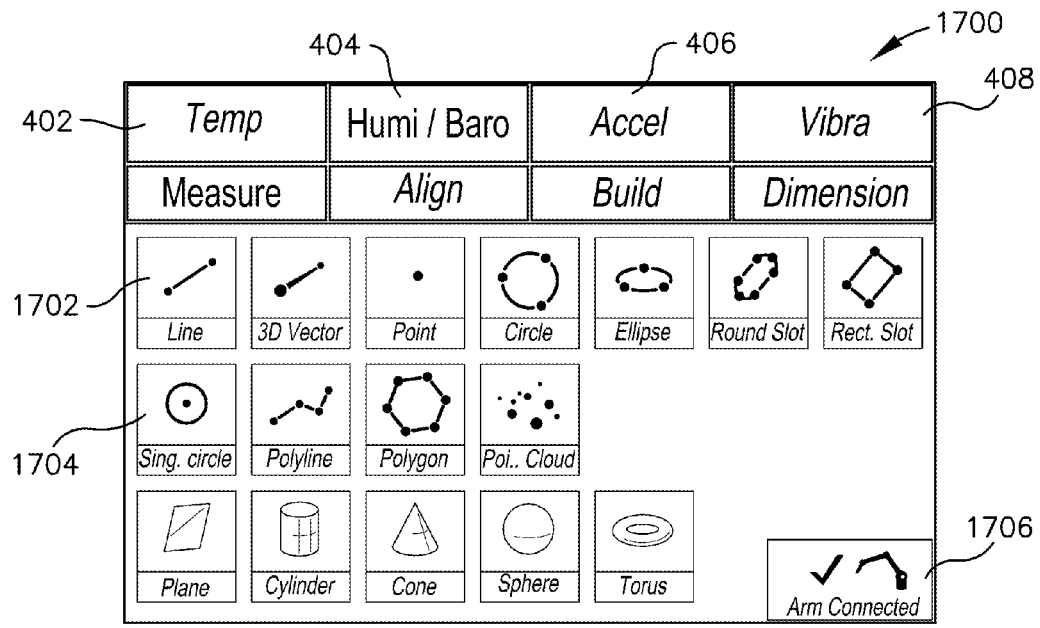
FIG. 17 shows a measurement software screen for measurement software associated with a smart stand.

FIG. 17 shows a measurement software screen for measurement software associated with a smart stand. Conventional CMM measurement software resides on a laptop or general purpose computer. Some CMMs such as the Faro Edge have basic measurement software on the arm itself. Nevertheless, many CMMs will not have built-in measurement software. In many environments, it can be inconvenient or infeasible to bring a laptop or other conventional computer into the measurement workspace. In various embodiments, measurement software is provided in connection with either display module 200 or sensor module 220. In the embodiment with the measurement software contained in the display module 200, the smart stand is completely self contained, and measurements can be taken and stored in the smart stand itself without an external laptop, tablet, or even a smartphone. Moreover, since everything needed to perform and store measurements is contained in the smart stand no network connection is needed, meaning the smart stand can be used for measurement in remote areas and because of the removable rechargeable battery, which can power the smart stand for at least 8 to 10 hours, if a user brings multiple charged batteries, the user can use the smart stand for measurements for an extended period of time even without access to a power-line power connection.

The use of smart stand on-board measurement software aids in portability as well as enables the elimination of additional pieces of hardware and cords that can be a trip hazard.

In various embodiments, the smart stand interfaces with the CMM it is supporting directly via a wired connection like usb, ethernet, firewire etc, or over a wireless connection via wifi, bluetooth, etc. It could also interface through a relay computer where the computer was connected to the arm via one of the methods mentioned above and the computer was connected to the smart module, which housed the measurement software, either via wired or wireless connection. In various embodiments, the CMM feeds measurement points and data directly to the display module 200 or the sensor module 220 which would allow the operator to make feature-based geometric measurements enabling both inspection and reverse engineering capabilities with a system simply comprised of an smart stand and a CMM as noted above. Such features include line 1702 and single point circle 1704. Single point circle is a circle that is calculated based on a known diameter cmm probe sphere and an intersecting plane that was previously measured. It is captured by placing the CMM probe into a hole that is smaller than the diameter of the ball, as well as the other features disclosed in FIG. 17, or any other measurement software features. In various embodiments, the measurement software screen will reflect the state of the connection to the CMM. In the illustrated embodiment, the smart stand has established a communication connection to a measurement arm.

Smart stand onboard measurement capability combined with the onboard sensor suite and feedback allows an operator to have a complete turnkey system comprised of a smart stand and a portable CMM that allows for measurement collection and setup feedback allowing for optimized and confident usage of a portable CMM to allow for highly accurate measurement results.

Figure 18:
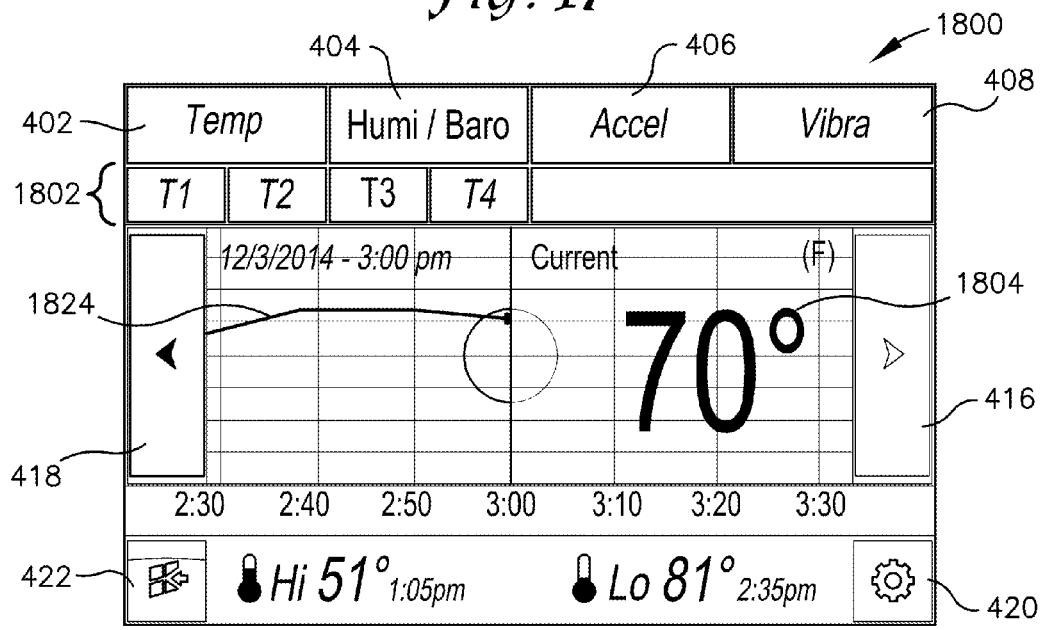
FIG. 18 shows a detail screen for a temperature sensor associated with a smart stand.

FIG. 18 shows a detail screen for a temperature sensor associated with a smart stand. As described in connection with FIG. 15, in various embodiments, the detail screens can be navigated to by the user using tabs 402, 404, 406, and 408. In the embodiment shown in connection with screen 1800, details can be displayed for four different temperatures by selecting T1-T4 from the set of buttons 1802. As noted in connection with FIG. 15, the user can navigate back to the summary screen by touching or clicking on summary screen icon 422. The user can navigate to the settings screen by touching or clicking settings icon 420.

In various embodiments, a historical graph of the displayed parameter is shown by way of trend line 1824 and using arrow buttons 418 and 416, the user can scroll forward and backward in time to view the observed parameter value at the particular time. As noted in connection with FIG. 15, the units of time per division are ten minutes. In an embodiment, the amount of time per division is configurable in the settings part of the smart stand application. In this way the user can control the time resolution when viewing the trend line corresponding to the parameter being displayed in the particular detail screen. As noted in connection with FIG. 15, the bar will be red, yellow, or green depending on error, warning, or no-error condition respectively.

Figure 19:
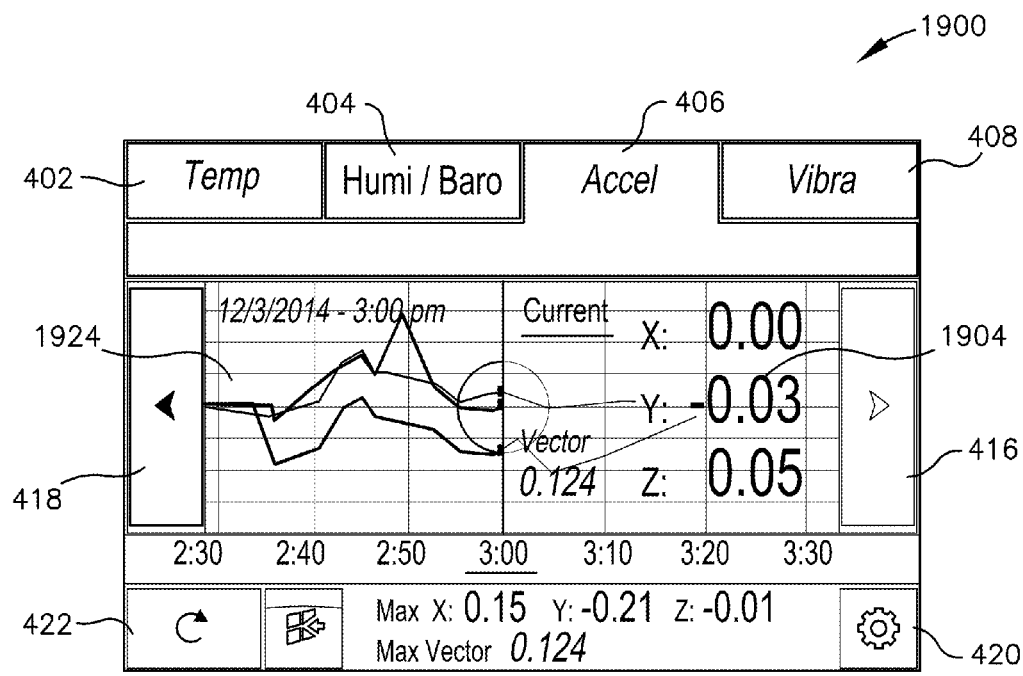
FIG. 19 shows a detail screen for an accelerometer sensor associated with a smart stand.

FIG. 19 shows a detail screen 1900 for an accelerometer sensor associated with a smart stand. Tabs and buttons 402, 404, 406, 408, 418, 416, 420, and 422 are described in connection with FIGS. 15 and 18. In various embodiments, the values shown in panel 1904 correspond to the forces experienced by an accelerometer in the x, y, and z directions. In an embodiment, a vector combination of the x, y, z, forces is shown under the Vector label in panel 1904. In an alternative embodiment, the values associated with x, y, and z correspond to a difference between the baseline x, y, and z, forces and the vector corresponds to a vector magnitude of the differential forces. In another alternative embodiment, the x, y, z, and magnitude values correspond to a maximum differential since the last time the parameters were reset and a new baseline was set.

Figure 20:
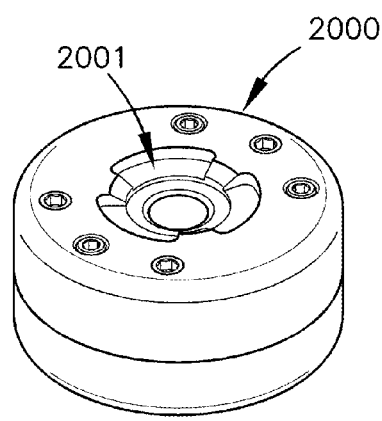
FIGS. 20-22 show top, bottom, and exploded view of a wireless sensor for use in connection with a smart stand.
Figure 21:
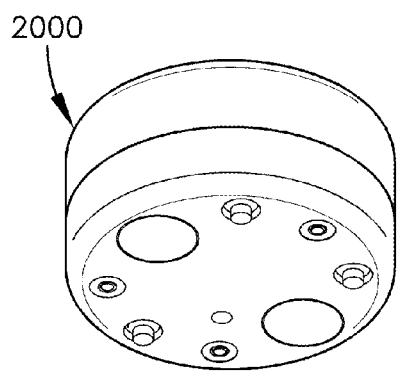
Figure 22:
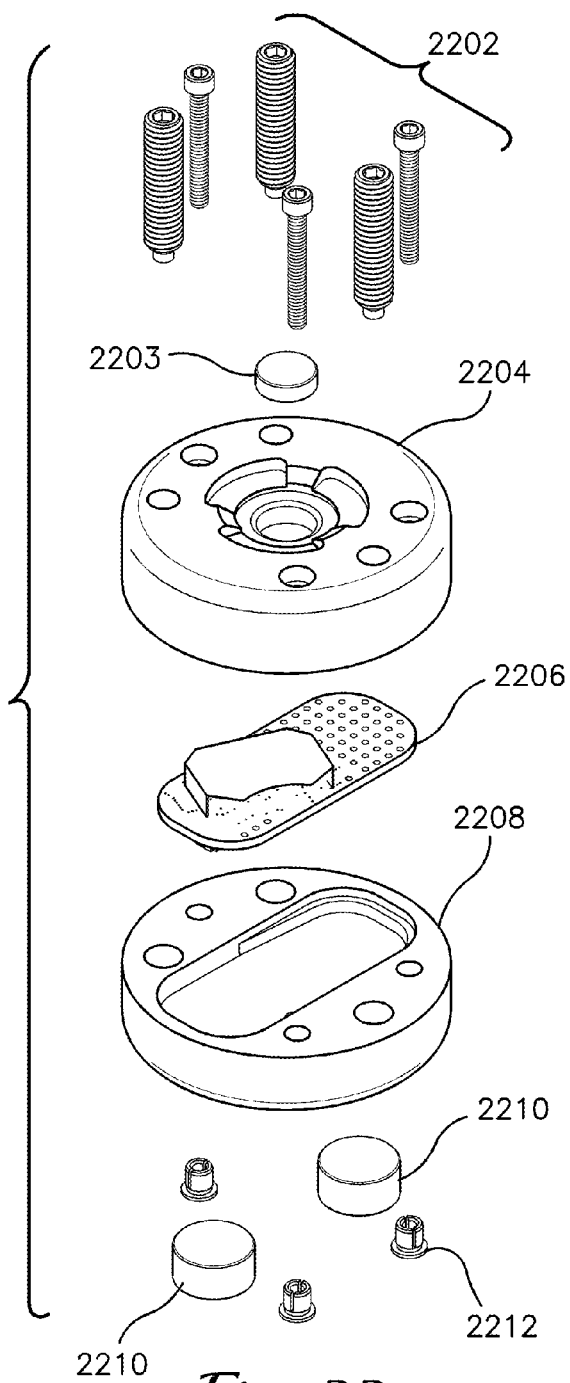

FIGS. 20-22 show top, bottom, and exploded view of a wireless sensor for use in connection with a smart stand. In various embodiments, sensor 2000 is also a SMR monument that is capable of magnetically supporting an SMR at surface 2001 in connection with magnet 2203. In various embodiments, the sensor has a top half 2204 and a bottom half 2208. In an embodiment, the halves are machined from Delrin, however it is understood that the halves can be constructed from any suitable material. In an embodiment, the halves are 3D printed from a material such as ABS. In another embodiment, the top half is machined out of metal and the bottom half is constructed from a material that does not act to shield the wireless communications to and from the sensor 2000.

In various embodiments, screws 2202 fasten the two halves together as well as providing a stable set of three points to stabilize the sensor 2000 when it is magnetically attached to a ferromagnetic surface by way of magnets 2210. In an embodiment, retainers 2212 partner with screws 2202 to retain the two halves.

In various embodiments, microcontroller platform 2206 is programmed to communicate with the smart stand to provide environmental information such as temperature, humidity, and barometric pressure. In addition to the environmental sensors, in an embodiment the microcontroller platform includes a battery, a wireless chipset, such as Bluetooth or Bluetooth low energy ("BLE"), and an accelerometer, gyroscope, and/or magnetometer. In an embodiment, the microcontroller is fitted with a rechargeable battery and a battery recharge circuit.

It is understood that sensors need not be SMR monuments and need not be wireless, but the wireless nature of sensor 2000 provides advantages over wired sensors in terms of being able to relocate the sensor 2000 without having to re-route wires as well as the advantage of not having wires being a tripping hazard or otherwise getting in the way.

In various embodiments, the sensor 2000 can communicate wirelessly with the tablet (or smartphone) 12 using the app that runs on the tablet 12 independently from the smart stand itself.

The invention claimed is:

1. A metrology sensor module comprising:
   a movement sensing device capable of sensing movement, the movement sensing device being attached to a metrology mount supporting at least one portable coordinate measuring machine, the metrology mount being capable of detecting a measurement accuracy impacting event of sufficient magnitude that it results in an amount of movement of the metrology mount, which amount is provided by the configurable warning threshold of the metrology sensor module and is determined to impact the accuracy of subsequent measurements made by the portable coordinate measuring machine supported by the metrology mount.

2. The metrology sensor module of claim 1, wherein the movement sensing device is a digital electro mechanical accelerometer.

3. The metrology sensor module of claim 1, wherein the movement sensing device is an optical sensor and associated fixed target.

4. The metrology sensor module of claim 3, wherein the fixed target is a 2d barcode.

5. The metrology sensor module of claim 3, wherein the fixed target is a chessboard.

6. The metrology sensor module of claim 3, wherein the optical sensor is a digital camera that is configured to focus on the fixed target and wherein the metrology stand uses the digital camera to periodically capture image frames and calculate a difference in location of features from frame to frame.

7. The metrology sensor module of claim 3, wherein the optical sensor comprises at least one optical sensor configured to generate a three-dimensional point cloud.

8. The metrology sensor module of claim 1 further comprising: a temperature sensing device that is capable of detecting changes in ambient temperature that would be sufficient to impact the accuracy of the measurement device.

9. The metrology stand of claim 8, wherein the temperature sensing device comprises a wirelessly connected microcontroller that wirelessly communicates sensor parameters to the metrology stand.

* * * * *